Feb. 7, 1961 H. C. JOHNSON 2,970,794
INFLATABLE DE-ICING BOOT
Filed May 24, 1957 2 Sheets-Sheet 1

INVENTOR.
HERBERT C. JOHNSON
BY
ATTORNEYS

Feb. 7, 1961  H. C. JOHNSON  2,970,794
INFLATABLE DE-ICING BOOT
Filed May 24, 1957  2 Sheets-Sheet 2

INVENTOR.
HERBERT C. JOHNSON
BY
ATTORNEYS

United States Patent Office 2,970,794
Patented Feb. 7, 1961

2,970,794
INFLATABLE DE-ICING BOOT
Herbert C. Johnson, Minneapolis, Minn., assignor to the United States of America as represented by the Secretary of the Air Force
Filed May 24, 1957, Ser. No. 661,555
4 Claims. (Cl. 244—134)

The invention relates generally to an inflatable and expendable de-icing boot for removing in-flight ice accretions from an aircraft wing or the like. More particularly the invention is concerned with an inflatable de-icing boot adhesively attached to the leading edge of an aircraft wing or other surface to be protected and which pulls free when inflated thereby resulting in removal of the boot along with the ice accretion by the air stream.

When aircraft are flown in areas where relatively low temperatures prevail or at certain altitudes, a serious hazard is created by the accumulation of ice on the leading edges of wings, control surfaces, landing struts and other vital parts. Various methods are presently being employed to prevent or remove this ice accumulation from the parts of the aircraft which are affected. The most commonly used method is that of permanently attaching a flexible inflatable sheath to the portion of the aircraft to be protected, especially the leading edge of the wing, and alternately inflating and deflating said sheath so that the ice which accumulates on the sheath is broken and swept away by the air stream.

The primary disadvantage of the foregoing method lies in the fact that the aero-dynamic profile of the aircraft is corrupted by the addition of the sheath. Another disadvantage of the permanently attached de-icing boot is that riveting or similar fastening means are required to attach the boot and the consequent weakening of the structure results in the necessity of adding reinforcing members which in turn adds to the overall weight of the aircraft.

Most commercial aircraft operate primarily in the ice-forming zone, therefore these disadvantages are considered unavoidable because the danger of ice formation nearly always is present particularly during the winter months. However, present day high performance military aircraft normally operate at altitudes above the zones where icing ordinarily occurs and hence are only exposed during the initial climb and let down portions of the aircraft's basic mission. This is particularly true in the case of winged pilotless aircraft and guided missiles where the aircraft is designed to accomplish one mission only and speed and control characteristics are of the utmost importance.

Accordingly, the primary object of the invention is to provide a reliable, light weight, easily attachable de-icing boot for removing ice accretions on aircraft structures, which is removable in flight after the aircraft has passed through the ice forming zone.

Another important object of the invention is to minimize the effective corruption of the aerodynamic profile as a result of adding a de-icing boot by providing a boot which is adhesively attached and which may be released from the aircraft when the boot is no longer needed to perform its function.

A still further object of the invention is to provide a means whereby aircraft structures are de-iced after the ice accretion and, when the ice forming conditions no longer exist, the de-icer may be released thereby returning to the aircraft all of the advantages of an uncorrupted aerodynamic profile.

The particular advantage of releasing the de-icer after it is no longer needed lies in the fact that the aircraft no longer is subjected to the detrimental aerodynamic effects caused by the corruption of the aerodynamic profile thereby resulting in easier control and superior all around performance of the aircraft.

Another feature of the invention is that the boot itself may be the prime ice remover or it may be used in conjunction with an auxiliary leading edge in which case the boot not only releases itself but sheds the auxiliary skin as well. This feature is especially important where it is desirable to vary the aerodynamic characteristics of the aircraft while in flight, upon reaching a certain altitude, or when some particular flight condition exists.

These and other objects, features, and advantages will become more apparent after considering the following detailed description taken in connection with the annexed drawings and appended claims.

In Fig. 1 there is shown a perspective view of the basic wing structure with the inflatable boot attached;

Figure 4:
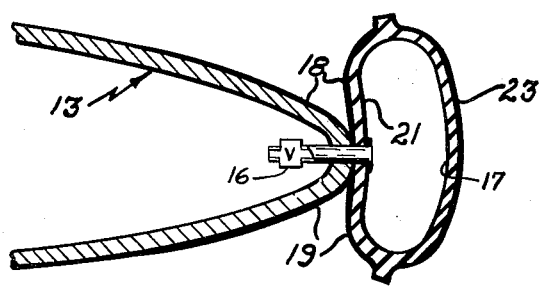
Figure 5:
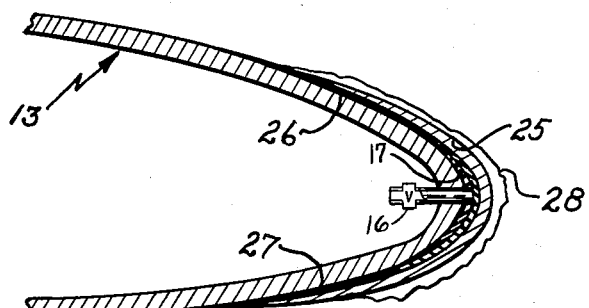
Figure 6:
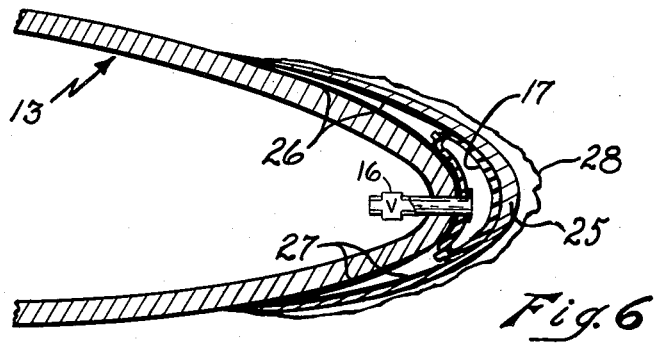
Figure 7:
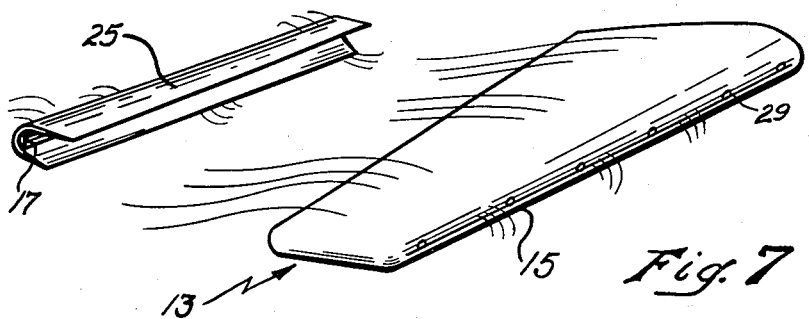

In Fig. 4, the boot is shown fully inflated and ready to be carried away by the air stream;

Fig. 5 is a sectional view of a wing member having the de-icing boot sandwiched between itself and an auxiliary leading edge;

Fig. 6 shows the wing with its auxiliary leading edge pulled away by the inflating boot;

In Fig. 7 there is shown a perspective view of the wing depicting the auxiliary leading edge with the boot attached being carried away by the air stream.

Figure 1:
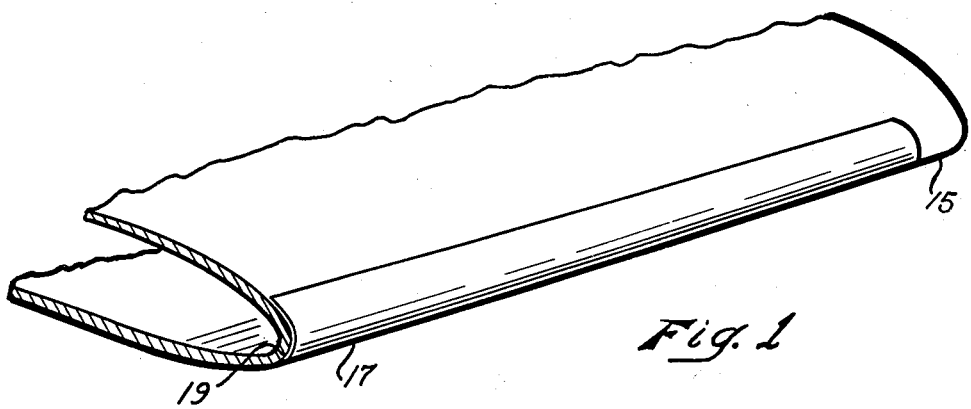
Figure 2:
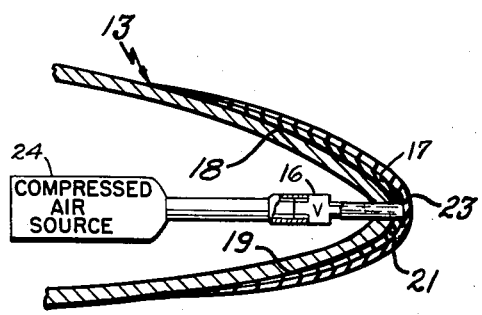
Fig. 2 is a sectional view of the wing, showing the adhesively attached boot in the uninflated condition.

Referring now to Figs. 1 and 2, there is shown a basic wing structure 13 having a relatively thin-section leading edge 15 to be protected from ice accretion. The problem of ice removal is aggravated by the increased difficulty of fracturing the ice which accumulates on a thin section as compared with that which forms on a thicker section. This problem is eliminated by employing a releasable boot 17 fastened to the leading edge 15 by the use of a separable light adhesive along the surfaces 18 and 19. When the boot 17 is fully inflated on the passage of gas through the distributor valve 16, the adhesive band along the surfaces 18 and 19 is broken by the change of configuration of the boot 17 and the boot is then carried away by the air stream.

The separable connection between the boot and the inflating means may comprise a pair of elements (not shown) which are resiliently held together in an air tight relation permitting the boot to be entirely inflated. When fully inflated, the internal pressure in the boot, as well as the air stream around the wing, serves to separate the boot and wing members. This connection forms no part of the present invention and it may, if desired, be of the type shown in United States Patent No. 2,363,592 granted to W. H. Hunter on Nov. 28, 1944.

Shown in section in Fig. 2, the boot 17 includes an inner wall 21 and an outer wall 23. The inner wall 21 of the boot is adhesively attached to the wing structure 13 along the adhesive surfaces 18 and 19. In this view the boot 17 is shown in the uninflated condition. The distributor valve 16 may be positioned between the boot 17 and a compressed air source 24. This source of pressurized fluid 24 may comprise a container of pressurized gas, such as nitrogen or carbon dioxide, under pressure which flows through the valve 16 into the boot 17.

Figure 3:
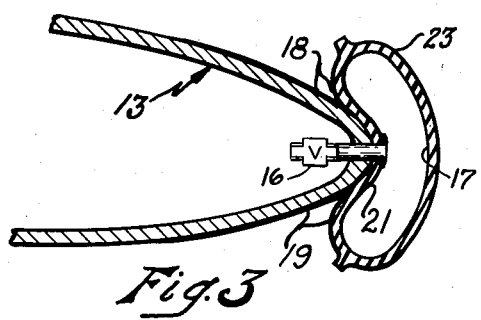
Fig. 3 shows, in section, the boot in a partially inflated condition.

In Fig. 3 the boot 17 is partially inflated. It will be seen that the inner and outer walls, 21 and 23 respectively, have separated and also the adhesive band on the surfaces 18 and 19 is partially broken.

Further inflation of the boot 17 causes more change in configuration until the condition shown in Fig. 4 is reached. Here the walls 21 and 23 of the boot 17 are further separated and the adhesive bond on the surfaces 18 and 19 has completely broken. Under these conditions the boot 17 with any ice which may have become attached to it, will be carried away by the air stream which is present around the wing structure 13 while the aircraft is in flight.

The inflation of the boot is initiated by the operator of the aircraft and in the case of guided missiles or pilotless aircraft would be initiated from some remote control point at the proper instant. After the boot has performed its function and been released the operation of the aircraft would undoubtedly be considerably more efficient.

In certain instances it may be desirable to actually change the aerodynamic configuration of the aircraft member after it has reached a certain position in its basic mission as well as removing the ice accretions on the aircraft. This can be accomplished as shown in Fig. 5 by using this invention with the addition of an auxiliary leading edge 25 over the boot 17 attached to the basic wing structure 13. The auxiliary leading edge 25 is attached along the surfaces 26 and 27 by means of a releasable adhesive in much the same manner as the boot 17 is attached when used alone.

When the boot 17 is inflated, as shown in Fig. 6, the auxiliary leading edge 25 including the attached ice accretion 28, is forced to detach itself from the wing member 13. This results in its being carried away by the air stream of the aircraft and taking along with it the inflatable de-icing boot 17. The shedding of the auxiliary leading edge 25 including ice accretion and boot 17 is depicted in Fig. 7. It has become detached and caught by the air stream of the aircraft to be swept away, since presumably, its usefulness in the flight mission has ended. It will be noted that the auxiliary skin 25 necessarily covers a greater portion of the aerodynamic surface than the boot 17 and holds it in place until the boot is ready for inflation and subsequent release. A series of small openings 29 become exposed along the leading edge of the wing member 13 after the boot has been released.

The boot is ordinarily inflated by communicating the space between the inner and outer walls 21 and 23 with a compressed air source in the aircraft through a suitable distributor valve 16 connected directly to the boot and located at the leading edge of the wing member 13. The inflating source could also comprise a self-contained charge of chemicals which liberate gas upon the combining of chemicals which may be initiated by any well known electrical means. The latter would be more desirable in applications in pilotless aircraft where the control point is far removed from the aircraft.

Although the invention has been described with reference to particular embodiments, it will be understood to those skilled in the art that various changes and modifications can be made therein without departing from the invention.

Having thus described my invention what I claim as new and desire to secure by Letters Patent of the United States is:

1. In combination, an aircraft wing member having releasably attached thereto an inflatable boot and a rigid auxiliary leading edge extending over said boot, said boot including a tube portion having forward and back walls forming a chamber, and adapted to be forwardly distended upon inflation, separable means communicating with said inflatable boot for conducting pressurized fluid to the tube portion of said boot, said means operating to inflate said boot so that its forward distension results in the separation and release of itself and said auxiliary leading edge from said wing member to permit the air stream around the aircraft to carry away said released boot and auxiliary leading edge.

2. In combination, an aircraft wing member having adhesively bonded thereto an inflatable boot and a rigid auxiliary leading edge extending over said boot, said boot having a tube portion comprising a forward and back wall forming a chamber and adapted to be forwardly distended upon inflation, separable means communicating with said inflatable boot for conducting pressurized fluid to the tube portion of said boot, said means operating to inflate said boot so that its forward distension results in the fracture of the adhesive bond attaching said auxiliary leading edge to said wing member to release said boot and auxiliary leading edge including any ice accretion thereon, permitting the air stream around the aircraft to carry away said released boot and auxiliary leading edge.

3. A covering for disposition along a leading edge of an aircraft structure for releasable attachment thereto, said covering comprising an inflatable boot having a chamber therein with a wall portion adapted to be distended forwardly upon inflation, releasable adhesive means on one surface of said boot for securing it to said aircraft structure, and separable means communicating with said chamber for conducting pressurized fluid to the chamber in said boot, said means operating to release said covering from said aircraft structure by inflating and forwardly distending said boot until its adhesive attachment is released to allow the air stream around the aircraft to carry said covering away from said aircraft structure thereby leaving said leading edge aerodynamically clean.

4. A separable inflatable boot for removing an accumulation of ice on a leading edge of an aircraft structure, separable adhesive means for releasably bonding said boot to the leading edge of said structure, said boot comprising a substantially gas tight chamber having inner and outer walls adapted to be distended forwardly upon inflation, and separable means communicating with said chamber of said inflatable boot for conducting pressurized fluid to the interior of said gas tight chamber, said means operating to separate said boot from said aircraft structure by pressurizing said chamber by inflation until said walls are forwardly distended sufficiently to break the adhesive bond and separate said boot from said aircraft structure thereby permitting said boot with any ice accumulation attached thereto to be carried away in the air stream of said aircraft structure to leave the leading edge aerodynamically clean.

References Cited in the file of this patent

UNITED STATES PATENTS

| | | |
|---|---|---|
| 2,106,323 | Huntington | Jan. 25, 1938 |
| 2,363,592 | Hunter | Nov. 28, 1944 |
| 2,504,684 | Harper | Apr. 18, 1950 |
| 2,539,576 | Gregg | Jan. 30, 1951 |
| 2,568,669 | Totheroh | Sept. 18, 1951 |

FOREIGN PATENTS

| | | |
|---|---|---|
| 98,343 | Sweden | Mar. 12, 1940 |
| 847,541 | France | July 3, 1939 |